Jan. 28, 1930. C. E. LUCKE 1,744,908
MEANS FOR PREVENTING PITTING OF ROTATABLE PUMP IMPELLERS,
HYDRAULIC TURBINE RUNNERS, AND ANALOGOUS STRUCTURES
Filed May 12, 1926

CHARLES E. LUCKE
INVENTOR
BY
ATTORNEY

Patented Jan. 28, 1930

1,744,908

UNITED STATES PATENT OFFICE

CHARLES E. LUCKE, OF NEW YORK, N. Y., ASSIGNOR TO WORTHINGTON PUMP AND MACHINERY CORPORATION, OF NEW YORK, N. Y., A CORPORATION OF VIRGINIA

MEANS FOR PREVENTING PITTING OF ROTATABLE PUMP IMPELLERS, HYDRAULIC TURBINE RUNNERS, AND ANALOGOUS STRUCTURES

Application filed May 12, 1926. Serial No. 108,575.

This invention relates to centrifugal pumps, screw pumps, hydraulic turbines and analogous structures, and the primary object of the invention is to provide a simple, relatively inexpensive means for preventing the pitting of rotatable runners, such as pump impellers, hydraulic turbine runners and like structures.

Considerable inconvenience, expense and loss of efficiency have been occasioned in centrifugal or screw pumps, turbines, etc., by the pitting of the impellers and runners of such mechanisms, and extended investigation of this subject has led to the conclusion that the pitting occurs in rotatable runners at points where the water pulls away from or skips the metal surface and that the active agent in the pitting process is oxygen released from the water, with or without other contributing causes. This oxygen becomes highly concentrated in the cavities or vacuous places, and attacks the metal, making an extremely rapid process of deterioration as compared with atmospheric corrosion, due to the fact that the products of the pitting are carried away and the pitted surface is exposed to further attack. The action begins as very fine pits on the surface of the metal and progresses inwardly, gradually honeycombing the surface until its acquires a spongy appearance.

From practical experiences it has been proved that pitting occurs where the stream of water pulls away from the surface of the rotatable runner, whether it be the impeller of a centrifugal or screw pump or the runner of a hydraulic turbine. This occurs where the pressure is locally reduced to a low enough value to release gases from solution with water vapor, and while related to suction head conditions is also due to changes in direction of flow of water and the curvature of the walls of guiding passageways. In any event the stream is not kept in contact with the runner surface and it can be seen that sharp curves, humps, or depressions will affect pitting by establishing zones of pressure too low to keep water in contact with the surfaces of the flow guiding passageways.

Whenever the main stream of water pulls away from the runner surface, there is an opportunity for dissolved oxygen to be drawn from the passing stream of water, the oxygen being released by the locally low pressure. As the solubility of oxygen is much higher in water than nitrogen is in water, it follows that gases so released following an absorption by water will contain more oxygen than is contained in air. Water comes into the pump, turbine or the like containing the full amount of dissolved oxygen with other gases corresponding to the pressure. In passing through the mechanism, the pressure is suddenly reduced to a lesser value with the result that minute bubbles of gases including oxygen and some water vapor appear in the water. Where the passages in the runner are completely filled with water these minute bubbles are swept along through the mechanism and do not have an opportunity to accomplish their destructive work, but where eddylike spaces or cavities exist there is an opportunity for oxygen to remain and being highly concentrated it is at these places where the pitting of the runner occurs.

The term, "pitting" is used in this specification to describe the processes of corrosion due to the above mentioned actions often called cavitation in rotatable runners, in order to distinguish it from other types of corrosion.

Various conditions cause cavitation or the forming of vacuous spaces in rotatable runners, such as, improper design, suction lifts that are too high, the running of a properly designed mechanism under conditions widely different from those for which it was designed, etc.

While cavitation is probably the paramount cause of pitting in rotatable runners, other causes and conditions may cause the same or similar results and it is an object of the present invention to plate or coat the surface or surfaces of a rotatable runner, such as the impeller of a centrifugal or screw pump, the runner of a hydraulic turbine, or analogous structures, which surface or surfaces are subjected to pitting, with a material nonresponsive to the attack of oxygen or other pitting agents.

In endeavoring to overcome the detrimental effects caused by pitting of rotatable runners extensive experiments have been conducted and many metals such as cast iron, cast steel, pure iron and steel with a high percent of carbon and manganese, in short nearly all known ferrous alloys and in addition a great many non-ferrous alloys, especially the bronzes have been tried out and while some of these metals have been found to offer more resistance to pitting than others, all were pitted sufficiently to impair the efficiency of the mechanism with which they were used and caused delay in its use by requiring stoppage for repairs or replacements.

Various kinds of cements, paints and metal spraying processes have been tried out without real success, in that they lacked sufficient mechanical strength to stand up for any length of time or for some other reason, and electric arc welding processes have been resorted to; while some experiments of drilling holes through the runner to relieve cavitation have been made, which, however, caused a definite loss of efficiency where the holes were large enough to make any appreciable effect.

In carrying out the present invention the parts of the rotatable runner which are subject to pitting are electrochemically coated with a substance that adheres and resists the action of pitting agents; for example they are plated with chromium or a chromium composition such as that commercially known as "Crodon" which has been found by tests and experiments to remain unaffected by practically all corrosive influences.

With these objects in view, the invention consists in various features of construction and combination of parts, which will be first described in connection with the accompanying drawings, showing means for preventing pitting of rotatable pump impellers, hydraulic turbine runners and analogous structures, of the preferred form embodying the invention, and the features forming the invention will be specifically pointed out in the claims.

In the drawings—

Figure 1:
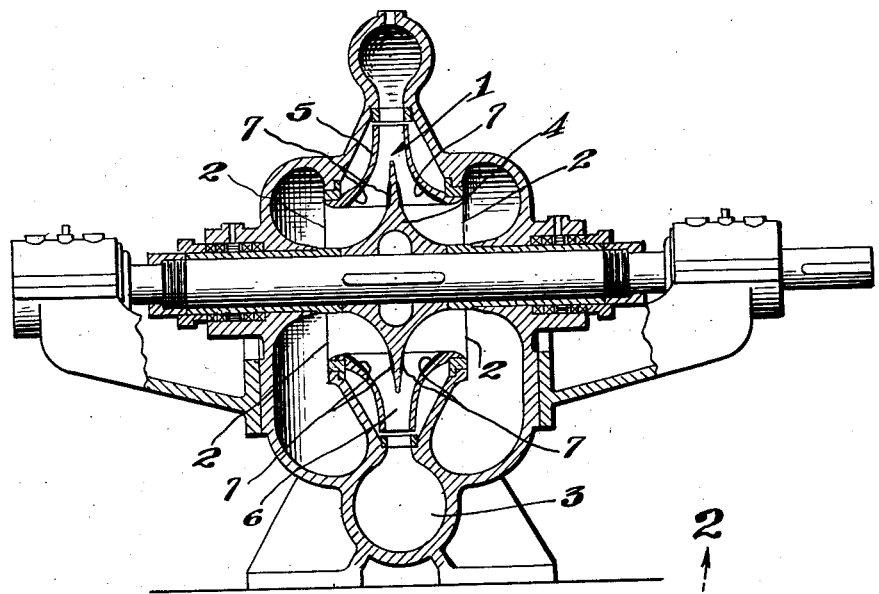
Figure 1 is a section through a centrifugal pump illustrating the places where pitting usually occurs and showing the surfaces of such places covered with a substance non-responsive to pitting agents.
Figure 2:
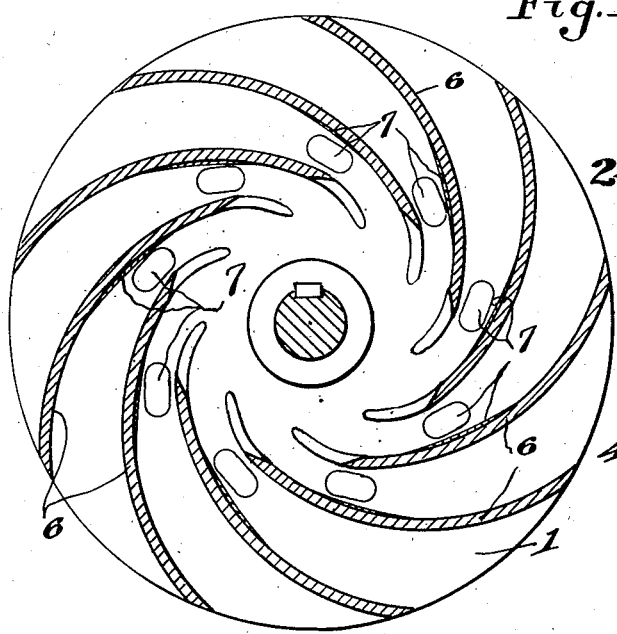
Figure 2 is a section through a centrifugal pump impeller and taken on the line 2—2 of Figure 3.
Figure 3:
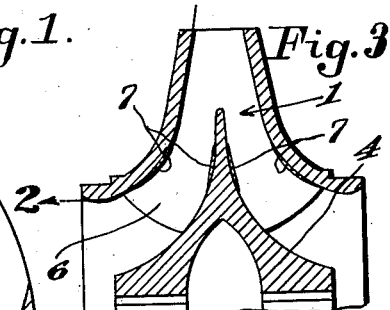
Figure 3 is a fragmentary cross-section through a pump impeller such as shown in Figure 1.
Figure 4:
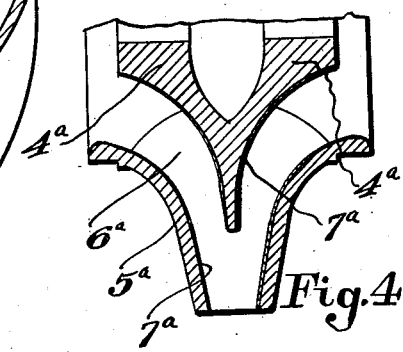
Figure 4 is a fragmentary section through a pump impeller showing the entire surfaces which are engaged by the water, coated with a substance which is non-responsive to pitting agents.

Referring particularly to the drawings, wherein the invention is illustrated as applied to centrifugal pumps, the water enters the impeller or runner 1 through the inlets 2 and passes through the impeller or runner into the discharge channel 3. In some instances cavities or vacuous spaces are formed in the impeller resulting in pitting of the impeller in the manner above referred to and to overcome such pitting of the impeller, parts of the impeller disc 4, shroud 5 and vanes 6 are plated or coated with a substance, which resists the action of pitting agents, as shown at 7; for example, they are plated with chromium or "Crodon" or the like. In Figure 4 of the drawings, the entire surfaces of the impeller disc 4ª, shroud 5ª and vanes 6ª which form the passageways through which the accelerated liquid passes and which engage the liquid during its passage through the runner, are coated or plated with the substance or material which is unaffected by oxygen or other pitting agents, such coating being indicated at 7ª. The plating or coating of the runner or impeller as above outlined provides a thin coating of the resisting material in good thermal contact with the runner or impeller; that is a contact which is not affected by expansion or contraction of the runner under temperature variations.

While in the drawings, and specification a centrifugal pump is shown and described, it is to be understood that the present invention is equally applicable to screw pumps, hydraulic turbines and analogous structures, and while chromium is specifically mentioned as the metal or substance with which the runner is plated to prevent pitting, it is to be recognized that highly valuable properties are rarely confined to a single metal, but are reproduced, in a more or less modified degree, in several members of a group and consequently the present invention is not limited to the specific use of chromium.

It will be understood that the invention is not to be limited to the specific construction or arrangement of parts shown but that these may be modified widely within the invention defined by the claims.

What is claimed is:

1. As an article of manufacture, a rotatable runner for hydraulic mechanisms having the surfaces of its flow guiding passageways electro-chemically plated with a coating comprising chromium.

2. As an article of manufacture, a rotatable runner for hydraulic mechanisms having the surfaces of its flow guiding passageways where the pressure is low enough to release absorbed gases from solution electro-chemically plated with chromium.

In testimony whereof I affix my signature.

CHARLES E. LUCKE.